Oct. 7, 1941.   C. M. OSTERHELD   2,257,887
OFF-PEAK WATER HEATING SYSTEM
Filed Oct. 28, 1940
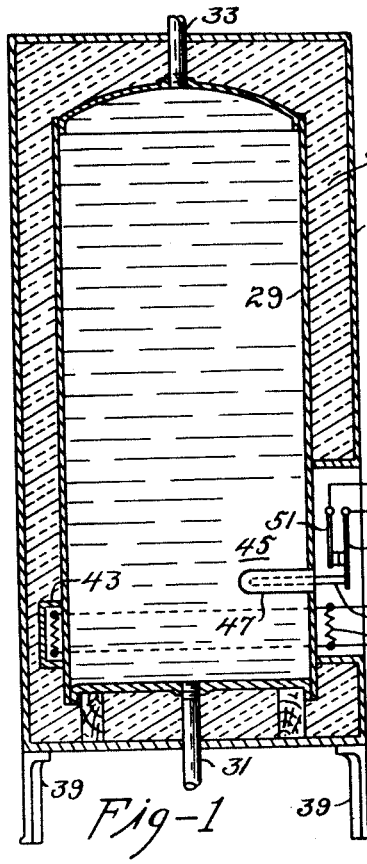
Fig-1
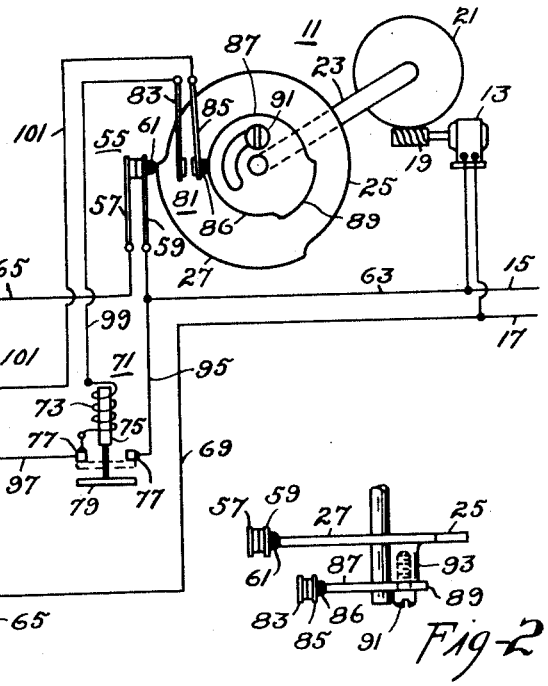
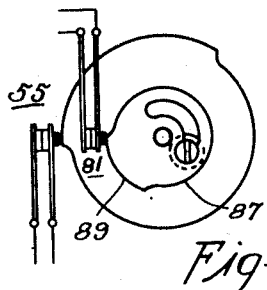
Fig-2
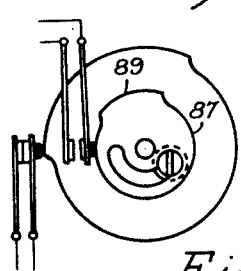
Fig-3
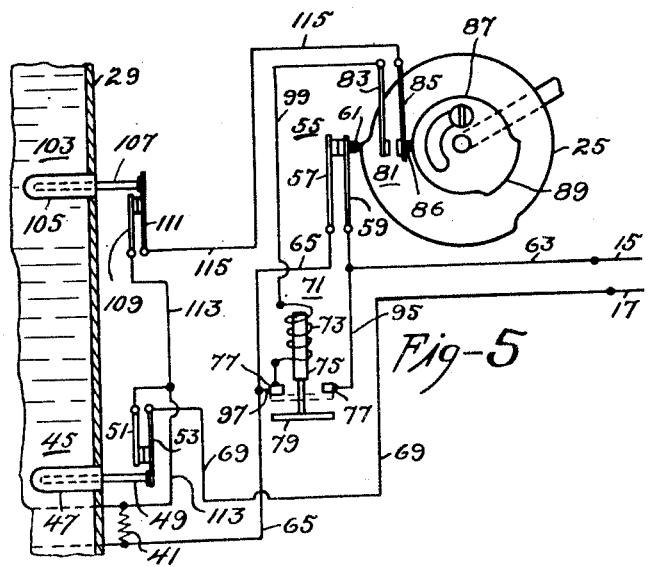
Fig-5
Fig-4
INVENTOR
CLARK M. OSTERHELD
BY
ATTORNEY Patented Oct. 7, 1941

2,257,887

UNITED STATES PATENT OFFICE 2,257,887

OFF-PEAK WATER HEATING SYSTEM

Clark M. Osterheld, Stoughton, Wis., assignor to McGraw Electric Company, Elgin, Ill., a corporation of Delaware Application October 28, 1940, Serial No. 363,105

8 Claims. (Cl. 219—39)

My invention relates to electric water heating systems and particularly to off-peak water heating systems.

One of the objects of my invention is to provide a relatively simple off-peak water heating system embodying means for ensuring prolongation of the heating of the water after the end of an off-peak period in case a predetermined amount of cold water is present in the tank at the end of an off-peak period.

Another object of my invention is to provide a water heating system including a time-controlled means cooperating with a tank water temperature controlled means to control the energization of the heater under ordinary operating conditions of use of hot water from a tank.

Other objects of my invention will either be apparent from a description of several forms of systems embodying my invention or will be pointed out in the course of such description and set forth in the appended claims.

In the single sheet of drawings,

Figure 1 is a view showing one diagram of connections as associated with a domestic hot water tank, and embodying my invention, Fig. 2 is a fragmentary top view showing the mechanical connections of certain parts of my system, Fig. 3 is a fragmentary view in front elevation showing a certain setting of parts of a timer used in my system, Fig. 4 is a view similar to Fig. 3 but showing the same parts in relatively different operating positions, and, Fig. 5 is a schematic view of a modified form of water heating system embodying my invention.

It has been found in actual practice that while an off-peak water heating system per se may be effective to meet most of the operating conditions to be met with in domestic use, occasions may arise when modifications of the ordinary system are necessary and useful and one of these modifications is the provision of relatively simple prolongation means for ensuring the continuation of the energization of the electric heater of a hot water tank beyond the end of an off-peak period in case the tank contains less than a predetermined amount of hot water at the end of an off-peak period.

Referring first to Fig. 1 of the drawing, I have there shown a continuously operative timer 11 as embodying an electric synchronous motor 13 which is adapted to be energized from a pair of supply circuit conductors 15 and 17 which may receive electric energy from a suitable central power station operating continuously. The motor 13 will therefore operate continuously and is provided with a worm gear 19 meshing with a worm wheel 21, which worm wheel is mounted on a shaft 23. The shaft 23 is to be understood as being suitably supported by bearings not shown in the drawing, so that the continuously operative motor will cause one complete rotation of the disc 21 and the shaft 23 in the twenty-four hours of a day.

A cam disc 25 is adjustably mounted on the shaft 23 and has two different outer radii, a portion 27 of the periphery having a somewhat larger radius than that of the portion 25. The part 27 of the disc 25 is shown as extending substantially one-third of the total peripheral length of the disc 25, that is, it will correspond to an off-peak period of substantially eight hours. The position of the cam disc 25 shown in Fig. 1 is that which, for illustrative purposes, is occupied by the disc at 10:00 p. m., which we may consider to be the start of an offpeak period which will therefore and at substantially 6:00 a. m. It is to be understood, however, that changes may be made in not only the duration of an off-peak period as provided by the peripheral extent of part 27 but also that the start and the end of an off-peak period may be changed in accordance with the ideas of the engineers of the utility supplying current to the supply circuit conductors 15 and 17.

The system particularly embodying my invention is adapted to be applied to a hot water tank 29, which is here shown as of the elongated circular or cylindrical type usually used in homes. The tank 29 is provided with a cold water inlet pipe 31 secured to the tank at the bottom thereof and with a hot water outlet pipe 33 connected therewith at the top portion thereof. A mass 35 of heat insulating material may surround the tank 29 and an outer casing 37 is adapted to hold the heat insulation in its proper operating position relatively to the tank 29. The tank may be supported by legs 39, all in a manner well known in the art, and while I have shown certain details of an ordinary domestic hot water tank, my invention is not limited to these details which are shown for illustrative purposes only.

An electric heater 41 may be provided and I have shown it as being positioned in a tunnel 43 and extending annularly around the tank 29 near the bottom thereof but I desire it to be understood that this position is not an essential one.

I provide a thermally actuable heater control switch 45 which, for illustrative purposes, is shown as embodying a tubular member 47 secured to a wall of the tank 29 in a fluid-tight manner to extend into the tank and be surrounded by the water content of the tank. The switch includes further an expansion rod 49 suitably supported by the tubular member 47, a relatively rigid contact arm 51 and a cooperating resilient contact arm 53 normally biased into engagement with contact arm 51 and engaged by the expansion rod 49 to be moved out of engagement with contact arm 51 when tubular member 47 is surrounded by hot water. I use the term "hot" to describe water which has been heated to a selected relatively high temperature such as is usually used in a home.

I provide a main timer-controlled switch 55 which comprises a relatively rigid contact arm 57 and a resilient contact arm 59 normally biased out of engagement with contact arm 57 but moved into engagement therewith when a small lug 61, of electric insulating material, on contact arm 59 is engaged by the part 27 of cam disc 25. Switch 55 is shown in its closed position which it is intended to occupy at the start of an off-peak period, irrespective of the time at which such engagement may be effected, as hereinbefore set forth, and is to be held in closed position during an off-peak period only.

Supply circuit conductor 15 is connected by a conductor 63 with contact arm 59 while contact arm 57 is connected by a conductor 65 with one terminal of the heater 41. The other terminal of heater 41 is connected by a conductor 67 with resilient contact arm 53 of switch 45. Contact arm 51 is connected by a conductor 69 with the other supply circuit conductor 17.

If it be assumed that the tank content is not all hot, that is, that thermally-responsive switch 45 is subject to cold water at the start of an off-peak period, an energizing circuit through heater 41 will be closed as follows: From conductor 15 through conductor 63, the engaged contact members 59 and 57, through conductor 65, the heater 41, through conductor 67, through the engaged contact members 53 and 51, then through conductor 69 to the other supply circuit conductor 17. It is thus obvious that energization of the heater 41 will be effected at the start of an off-peak period in case of the presence of an appreciable quantity of cold water at the start of an off-peak period and that should all or substantially all of the water in the tank be heated to a desired temperature within the duration of an off-peak period, thermally actuable switch 45 will cause disengagement of contact arms 53 and 51 and consequent deenergization of the heater. It is further evident that should withdrawals of hot water from the tank occur during the rest of the off-peak period after deenergization of the heater 41, as above described, thermally actuable switch 45 will effect reenergization of the heater 41 to cause heating of the water in the manner well known in the art.

I desire to here point out that while I have shown specific positions of the heater 41, and of the thermally actuable switch 45, I do not desire to be limited thereto but may so cooperatively position these two elements of my system that the heater 41 will be deenergized only when all or substantially all of the water in the tank has been heated to the desired temperature, generally designated by the term "hot."

Let it be assumed that the withdrawals of hot water reduced the amount of hot water in the tank to such an extent that all of the water in the tank was not heated to the desired temperature at the time of termination of an off-peak period. In order to prolong the energization of the heater I provide an electromagnetic prolongation switch and means to control the same according to time and according to tank water temperature.

For this purpose an electromagnetic switch 71 is provided which includes a coil 73, a magnetizable core member 75, a pair of fixed contact members 77 and a cooperating contact bridging member 79, all of these elements being well known in the art and I have, therefore, illustrated them generally only. I provide further an auxiliary timer-controlled switch 81 which switch includes a relatively rigid contact arm 83 and a resilient contact arm 85 normally yieldingly biased out of engagement with contact arm 83 as shown in Fig. 1 of the drawing. Timer-controlled means to actuate the switch 81 and particularly a lug 86, of electric-insulating material on the arm 85 thereof, includes an auxiliary cam disc 87 adjustably mounted in front of cam disc 25. Cam disc 87 has a predetermined peripheral portion 89 thereof of greater outer radius than the rest of the peripheral surface of the cam disc and it may be assumed, for instance, that the time extent of part 89 of disc 87, having a greater outer radius, is on the order of three or four hours. The disc 87 is shown as in a position to cause substantially full prolongation provided by the peripheral portion 89 but it may be peripherally adjusted relatively to cam disc 25 and held in such position by a small set screw 91 which is adapted to have screw-threaded engagement with short stud 93 integral with or secured to the front surface of cam disc 25, as shown more particularly in Fig. 2 of the drawing.

Contact arm 59 is connected to one of the fixed contact members 77 by a conductor 95 and the other fixed contact member 77 is connected by a conductor 97 with conductor 65. One terminal of coil 73 is connected to that fixed contact 77 which has conductor 97 connected therewith, and the other terminal of coil 73 is connected by a conductor 99 to contact arm 83. Contact arm 85 is connected by a conductor 101 with contact arm 53 and therefore also to conductor 67.

Let it be assumed that contact arms 85 and 83 have been moved into engagement with each other a short time before the end of the off-peak period, that is, a short time before disengagement of contact arms 59 and 57 from each other, whereby a prolongation energization circuit will be established as follows, by the action of the electromagnetic contactor 71. The energizing circuit through coil 73 may be traced as follows: From conductor 15 through conductor 63, through engaged contact arms 59 and 57, through conductors 65 and 97, through coil 73, through conductor 99, through engaged contact arms 83 and 85, through conductor 101, through engaged contact arms 53 and 51 and from there through conductor 69 to the other supply circuit conductor 17. This will cause magnetization of the core 75 and resultant upward movement of the core 75 and of the contact bridging member 79 into engagement with the fixed contact members 77. This will cause closing of a heater-energizing circuit traceable as follows: From supply circuit conductor 15 through conductors 63 and 95, through engaged contact members 77 and 79, through conductors 97 and 65, through heater 41, through conductor 67, through engaged contact arms 53 and 51 and from there through conductor 69 to the other supply circuit conductor 17. Under the assumed conditions that thermally actuable switch 45 is subject to the temperature of relatively cold water, as hereinbefore stated, this energizing circuit will continue even after contact arm 59 has been moved out of engagement with contact arm 57 by reason of the turning movement of part 27 of disc 25 out of engagement with the knob 61 on contact arm 59. A holding circuit for the coil 73 of the electromagnetic switch 71 may be traced as follows: From supply circuit conductor 15 through conductors 63 and 95, through engaged contact members 77 and 79, through coil 73, through conductor 99, through engaged contact arms 83 and 85, through conductor 101, through engaged contact arms 53 and 51 and from there through conductor 69 to the other supply circuit conductor 17. It is evident that this holding circuit for the coil 73 is independent of the main timer-controlled switch 55 so that energization of the heater 41 will continue beyond the end of an off-peak period, at which time the main timer-controlled switch was opened, this energization continuing until the thermally actuable switch 45 is subject to the temperature of hot water in the tank and causes disengagement of its contact arms with resultant deenergization of the heater when substantially all of the water in the tank is hot.

Reference to Fig. 3 of the drawing is here made as showing the position of the main and of the auxiliary timer-controlled switches 55 and 81 just before the end of an off-peak period when the main timer-controlled switch 55 is still closed and the auxiliary timer-controlled switch 81 has also been closed, all as hereinbefore described.

Reference to Fig. 4 of the drawing will show another position into which the auxiliary cam 87 may be moved manually to prevent any overrun if, for any reason, the operator or user of this system may desire such operation.

The system shown in Fig. 1 of the drawing is, as has already been set forth, effective to cause prolongation of the energization of the tank heater in case all of the water in the tank is not hot at the end of an off-peak period. I have illustrated, in Fig. 5 of the drawing, a modified system in which prolongation of the energization of the heater 41 is effected in case a predetermined fractional part of the total water content of the tank is cold or to put it in another way, in which less than a predetermined fractional part of the water content of the tank is hot at the end of an off-peak period.

In this modified system I provide an auxiliary thermally actuable switch 103 here illustrated as including a tubular member 105 secured to the wall of the tank 29 in a fluid-tight manner to be positioned inside of the tank, an expansion rod 107, a relatively rigid contact arm 109 and a resilient contact arm 111 normally yieldingly biased into engagement with arm 109 but moved out of engagement therewith by the expanded rod 107 when tubular member 105 is surrounded by hot water or by water having a selected relatively high temperature. Contact arm 109 of switch 103 is connected by a conductor 113 with contact arm 51 and also to one terminal of heater 41. Contact arm 111 is connected by conductor 115 with contact arm 85 of the auxiliary timer-controlled switch 81.

The operation of this modified system is substantially as follows: Let it be assumed that, at the start of an off-peak period, when the continuously operative timer and particularly the main and the auxiliary cam discs 25 and 87 are in the positions shown in Fig. 5 of the drawing, the main thermally actuable heater-controlled switch 45 was surrounded by cold water, that is, all of the water in the tank was not hot. Energization of the heater 41 would then be effected as hereinbefore described and would continue until thermal switch 45 was subject to the temperature of hot water when it would effect disengagement of contact arms 51 and 53 from each other with resultant deenergization of the heater 41. Should withdrawals of hot water occur during the rest of the off-peak period sufficient to subject tubular member 47 to cold water, reenergization of the heater 41 would be effected.

Let it now be assumed that withdrawals of hot water from the tank occur during the last part of an off-peak period to such an extent that auxiliary thermally actuable switch 103 is subjected to cold water with resultant engagement of contact arms 109 and 111 with each other. When the knob 86 on contact arm 85 engages portion 89 of disc 87 just before the end of an off-peak period, closure of the switch 81 will be effected and under the assumed condition of engagement of contact arms 109 and 111, a prolongation energization circuit will be closed by the action of prolongation switch 71 energized through a circuit as follows: From supply circuit conductor 15 through conductor 63, through engaged contact arms 59 and 57, through conductors 65 and 97, through one of the fixed contact members 77, through coil 71, through conductor 99, through engaged contact arms 83 and 85, through conductor 115, through engaged contact arms 111 and 109, through conductor 113 and through engaged contact arms 51 and 53 and from there through conductor 69 to the other supply circuit conductor 17. This causes energization of the core 75 and resultant upward movement of it and of the contact bridging member 79 whereby an auxiliary heater-energizing circuit is closed as follows: From supply circuit conductor 15 through conductors 63 and 95, through engaged contact members 77 and 79, through conductors 97 and 65, through heater 41, through conductor 113, through engaged contact members 51 and 53 and from there through conductor 69 to the other supply circuit conductor 17. It is obvious, of course, that if the upper auxiliary thermally actuable switch 103 is surrounded by cold water, the lower main thermally actuable switch 45 is also surrounded by cold water. A holding circuit for the coil 73 is also closed as follows: From supply circuit conductor 15 through conductors 63 and 95, through engaged contact members 77 and 79, through coil 73, through conductor 99, through engaged contact arms 83 and 85, through conductor 115, through engaged contact arms 111 and 109, through conductor 113, through engaged contact arms 51 and 53 and from there through conductors 69 to the other supply circuit conductor 17. This holding circuit will continue in its closed condition until disengagement of contact arms 85 and 83 at the end of the adjustably preset fixed length of a prolongation period when contact arm 85 moves out of operative engagement with the part 89 of larger outer radius.

It is thus evident that my system, in its several modifications, provides means for initiating the energization of the electric heater of a hot water tank at the start of an off-peak period unless all of the water in the tank is already hot and further provides for deenergization of the heater at any time during an off-peak period in case substantially all of the water content of the tank is hot. It further provides means for prolonging the energization of the heater beyond the end of an off-peak period in case the tank contains less than a predetermined quantity of hot water at the end of an off-peak period and this over-run or prolongation of the energization of the heater is adapted to extend for an adjustably predetermined fixed length of time. If the predetermined amount of hot water is present in the tank before the end of the prolongation period, the heater will be deenergized, but the energization of the heater will be prolonged only to the end of said preset prolongation period, deenergization of the heater then occurring irrespective of how much hot water is in the tank provided it is less than either a predetermined fractional part of the total water content or less than the total water content of the tank.

I have illustrated a particular position of the auxiliary thermally actuable switch as regards the height of the tank but I do not desire to be limited to this particular position since the auxiliary thermal switch of Fig. 5 of the drawing may be positioned at any point in the tank and the hereinbefore mentioned predetermined fractional part of the total water content of the tank will vary in accordance therewith so that I may ensure that the tank is at least filled with one-third of its total contents with hot water, one-half or two-thirds, all in accordance with the position of the auxiliary thermally actuable switch 103.

Various further modifications may be made in the systems embodying my invention and all such modifications clearly coming within the scope of the appended claims are to be considered as being covered thereby.

I claim as my invention:

1. An off-peak water heating system for a hot water tank having an electric heater, comprising a plurality of heater control switches controlled respectively and jointly by tank water temperature and by time-controlled means effective to cause energization of the heater at the start of an off-peak period if the tank contains an appreciable quantity of cold water at that time and to continue the energization of the heater for a preset length of time after the end of an off-peak period in case of the presence of a predetermined quantity of cold water in the tank at the end of an off-peak period.

2. An off-peak water heating system for a hot water tank having an electric heater, comprising a pair of heater control switches severally controlling the energization of the heater in accordance with time and tank water temperature and effective to start energization of the heater at the start of an off-peak period in case the tank is less than full of hot water and to stop energization of the heater during an off-peak period when all of the water in the tank is hot and another heater control switch controlled jointly by time and the temperature of the water at a predetermined point in the tank to prolong the energization of the heater for a fixed length of time after the end of an off-peak period in case the temperature of the water at said predetermined point is below a certain value at the end of an off-peak period.

3. An off-peak water heating system for a hot water tank having an electric heater, comprising a continuously operative timing means, a heater control switch movable to heater-energizing position by the timing means at the start of an off-peak period, a thermally actuable heater control switch electrically connected in series circuit relation relatively to the first named switch, responsive to tank water temperature and maintained in heater-energizing position until substantially all of the water in the tank is hot, said switches cooperating to start energization of the heater at the start of an off-peak period in case the tank contains an appreciable amount of cold water at the start of an off-peak period and to cause deenergization of the heater during the off-peak period when substantially all of the water in the tank is hot and a third switch controlled jointly by the timing means and by tank water temperature to cause prolongation of the energization of the heater for a fixed length of time beyond the end of an off-peak period in case of the presence of a predetermined amount of cold water in the tank at the end of an off-peak period.

4. An off-peak water heating system for a hot water tank having an electric heater, comprising a plurality of heater control switches controlled respectively and jointly by tank water temperature and by time-controlled means effective to cause energization of the heater at the start of an off-peak period if the tank contains an appreciable quantity of cold water at that time, to cause deenergization of the heater at any time during an off-peak period in case substantially all of the water in the tank is hot, to cause reenergization of the heater in case of withdrawal of an appreciable quantity of hot water from the tank during the rest of an off-peak period and to continue the energization of the heater for a preset length of time after the end of an off-peak period in case of the presence of a predetermined quantity of cold water in the tank at the end of an off-peak period.

5. An off-peak water heating system for a hot water tank having an electric heater, comprising a continuously operative timer, a heater control switch movable into closed position by said timer at the start of an off-peak period and held in closed position thereby during an off-peak period, a normally-closed tank water temperature responsive heater control switch movable into heater-deenergizing position when substantially all of the water in the tank is hot, an electromagnetic switch having its contacts electrically connected in shunt circuit with the timer-controlled switch, an auxiliary switch moved into closed position by said timer before the end of an off-peak period and held in closed position thereby during a preset fixed length of time after the end of an off-peak period and electric connections between all of said switches to cause energization of the heater at the start of an off-peak period and the closure of the timer-controlled switch in case of the presence of an appreciable quantity of cold water in the tank at the start of an off-peak period, to cause deenergization of the heater when substantially all of the water in the tank is hot, to cause reenergization of the heater during the rest of the off-peak period in case withdrawals of hot water from the tank reduce the quantity of hot water in the tank to below a predetermined quantity and to continue the energization of the heater for an adjustably preset length of time beyond the end of an off-peak period in case the quantity of hot water in the tank at the end of an off-peak period is less than said predetermined quantity.

6. An off-peak water heating system for a hot water tank having an electric heater, comprising a continuously operative timer, a heater control switch movable into closed position by said timer at the start of an off-peak period and held in closed position thereby during an off-peak period, a normally-closed tank water temperature responsive heater control switch movable into heater-deenergizing position when substantially all of the water in the tank is hot, an electromagnetic switch having its contacts electrically connected in shunt circuit with the timer-controlled switch, an auxiliary switch moved into closed position by said timer before the end of an off-peak period and held in closed position thereby during a preset fixed length of time after the end of an off-peak period and electric connections between all of said switches to cause energization of the heater at the start of an off-peak period and the closure of the timer-controlled switch in case of the presence of an appreciable quantity of cold water in the tank at the start of an off-peak period, to cause deenergization of the heater when substantially all of the water in the tank is hot, to cause reenergization of the heater during the rest of the off-peak period in case withdrawals of hot water from the tank cause the presence of said appreciable quantity of cold water in the tank and to cause prolongation of the energization of the heater beyond the end of an off-peak period for an adjustably predetermined length of time in case of the presence of at least said appreciable quantity of cold water in the tank at the end of an off-peak period.

7. An off-peak water heating system for a hot water tank having an electric heater, comprising a continuously operative timer, a heater control switch movable into closed position by said timer at the start of an off-peak period and held in closed position thereby during an off-peak period, a normally-closed tank water temperature responsive heater control switch movable into heater-deenergizing position when substantially all of the water in the tank is hot, an electromagnetic switch having its contacts electrically connected in shunt circuit with the timer-controlled switch, an auxiliary switch moved into closed position by said timer before the end of an off-peak period and held in closed position thereby during a preset fixed length of time after the end of an off-peak period and electric connections between all of said switches to cause energization of the heater at the start of an off-peak period and the closure of the timer-controlled switch in case of the presence of an appreciable quantity of cold water in the tank at the start of an off-peak period, to cause deenergization of the heater when substantially all of the water in the tank is hot, to cause reenergization of the heater during the rest of the off-peak period in case withdrawals of hot water from the tank cause the presence of said appreciable quantity of cold water in the tank and to cause prolongation of the energization of the heater beyond the end of an off-peak period for an adjustably predetermined length of time in case the tank is more than half full of cold water at the end of an off-peak period.

8. An off-peak water heating system for a hot water tank having an electric heater, comprising a continuously operative timer, means including a main timer-actuated heater control switch movable into closed position at the start of an off-peak period and into open position at the end of an off-peak period and effective to cause energization of the heater at the start of an off-peak period in case of the presence of an appreciable amount of cold water in the tank at the start of an off-peak period, an electromagnetic heater control switch electrically connected in parallel circuit relation with said timer-actuated heater control switch and an auxiliary timer-actuated switch electrically connected with said other switches and movable into closed position before the end of an off-peak period by the timer and effective to cause closing of the electromagnetic switch and continuance of the energization of the heater for a fixed duration beyond the end of the off-peak period in case of the presence of a predetermined quantity of cold water in the tank at the end of an off-peak period.

CLARK M. OSTERHELD.